US012654369B2

(12) United States Patent
Martins et al.

(10) Patent No.: US 12,654,369 B2
(45) Date of Patent: Jun. 16, 2026

(54) METHOD FOR PROTECTING A PROFILE STRUCTURAL PART OF AN AIRCRAFT AGAINST MECHANICAL WEAR AND/OR MECHANICAL IMPACT

(71) Applicant: Airbus Operations GmbH, Hamburg (DE)

(72) Inventors: Jose Martins, Hamburg (DE); Ulf Loeding, Hamburg (DE); Mathias Keanu Engelskirchen, Hamburg (DE); Frank Jaacks, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 83 days.

(21) Appl. No.: 18/626,458

(22) Filed: Apr. 4, 2024

(65) Prior Publication Data

US 2024/0335986 A1     Oct. 10, 2024

(30) Foreign Application Priority Data

Apr. 6, 2023     (EP) .................................... 23167137

(51) Int. Cl.
| | |
|---|---|
| *B29C 45/00* | (2006.01) |
| *B29C 45/26* | (2006.01) |
| *B29K 63/00* | (2006.01) |
| *B29K 75/00* | (2006.01) |
| *B29K 81/00* | (2006.01) |
(Continued)

(52) U.S. Cl.
CPC ...... *B29C 45/0053* (2013.01); *B29C 45/0001* (2013.01); *B29C 45/2602* (2013.01); *B29C*

*2045/0075* (2013.01); *B29K 2063/00* (2013.01); *B29K 2075/00* (2013.01); (Continued)

(58) Field of Classification Search
None
See application file for complete search history.

(56) References Cited

U.S. PATENT DOCUMENTS

| | | | |
|---|---|---|---|
| 11,572,148 B2 | 2/2023 | Cheng | |
| 2008/0128430 A1* | 6/2008 | Kovach | .................. B32B 27/00 |
| | | | 220/586 |

(Continued)

FOREIGN PATENT DOCUMENTS

| | | | | |
|---|---|---|---|---|
| CN | 106346692 A | * | 1/2017 | .............. F16B 37/14 |
| DE | 102014017411 A1 | | 6/2016 | |

(Continued)

OTHER PUBLICATIONS

European Search Report for corresponding European Patent Application No. 23167137 dated Sep. 25, 2023.

*Primary Examiner* — Virak Nguon
(74) *Attorney, Agent, or Firm* — Greer, Burns & Crain, Ltd.

(57) ABSTRACT

To manufacture a protected profile structural part of a fuselage of an aircraft, a sealant mold having a mold cavity having a cross-section that matches a portion of the profile structural part on which the surface to be protected is disposed is prepared. The mold cavity is filled with uncured wet sealant which is subsequently cured into a cured sealant member. The cured sealant member is then attached to the finished structural profile part in a non-movable manner to form a protective liner on the surface to be protected and to generate the protected profile structural part.

17 Claims, 1 Drawing Sheet

(51) Int. Cl.
  *B29L 31/26* (2006.01)
  *B29L 31/30* (2006.01)

(52) U.S. Cl.
  CPC ....... *B29K 2081/04* (2013.01); *B29L 2031/26*
      (2013.01); *B29L 2031/3082* (2013.01)

(56) References Cited

U.S. PATENT DOCUMENTS

| | | | |
|---|---|---|---|
| 2011/0220006 A1* | 9/2011 | Kaye | ..................... B29C 70/763 |
| | | | 428/192 |
| 2016/0159453 A1* | 6/2016 | Korenaga | ............... B64C 1/064 |
| | | | 156/60 |
| 2017/0036381 A1* | 2/2017 | Song | ....................... B29C 45/14 |
| 2017/0152949 A1 | 6/2017 | Wiseman et al. | |

FOREIGN PATENT DOCUMENTS

| | | | | | |
|---|---|---|---|---|---|
| EP | 1860250 | A1 | 11/2007 | | |
| EP | 2176123 | A1 | 4/2010 | | |
| EP | 2839946 | A2 | 2/2015 | | |
| EP | 3205470 | A1 | 8/2017 | | |
| EP | 4249200 | A1 | 9/2023 | | |
| GB | 2588967 | A * | 5/2021 | ............. | B64C 1/064 |

* cited by examiner

METHOD FOR PROTECTING A PROFILE STRUCTURAL PART OF AN AIRCRAFT AGAINST MECHANICAL WEAR AND/OR MECHANICAL IMPACT

CROSS-REFERENCES TO RELATED APPLICATIONS

This application claims the benefit of the European patent application No. 23167137.1 filed on Apr. 6, 2023, the entire disclosures of which are incorporated herein by way of reference.

FIELD OF THE INVENTION

The invention relates to a method for manufacturing a protective liner for a structural profile part of an aircraft. The invention further relates to a method for manufacturing a protected structural part of an aircraft.

BACKGROUND OF THE INVENTION

EP 3 205 470 A1 discloses the manufacture of parts made of thermoplastic material, where injection means are used to inject the thermoplastic material, e.g., polyamide.

EP 1 860 250 A2 discloses a seal for a facade system.

EP 2 839 946 A2 discloses a transfer system and a method for applying a film material to an elongate member.

EP 2 176 123 A1 discloses a composite laminate structure having an edge and an impact indicator which is carried by the edge.

US 2017/0 152 949 A1 discloses a sealant containment assembly where at least a portion of a fastener pattern is bound between at least two components, such as components used to form a portion of an aircraft. The sealant containment assembly includes at least one sealant containment member that sealingly engages peripheral portions of the components. The sealant containment member forms a sealing chamber around at least a portion of the fastener pattern. Fluid sealant flows into the sealing chamber and cures to seal fasteners within the fastener pattern that connect the components together.

GB 2 588 967 A discloses an aircraft structure, e.g., a stringer, rib, spar or rib attachment, that has a composite laminate body. The body has an edge and an edge cap covering the edge, wherein cured resin forming part of the body bonds the edge cap on the edge. The aircraft structure is manufactured by providing a dry fiber preform of a structural component, covering an edge of the preform with an edge cap, feeding or injecting uncured resin between the edge cap device and the edge of the preform to infuse the dry fiber preform and curing the resin.

DE 10 2014 017 411 A1 discloses a method for manufacturing a fiber composite part. A thermoplastic or elastomeric edge protection is attached to an edge of the fiber composite before the matrix of the fiber composite component is cured. After attaching the edge protection, the matrix of the fiber composite component is cured.

EP 4 249 200 A1 discloses a method for manufacturing a protective lining for aircraft parts. As an example, a tank wall liner can be manufactured in-situ by casting the sealant into a prepared mold that is formed at least at the bottom side by the part to be protected by the tank wall liner. Specifically, for fuel tanks, the bottom portion forms the bottom side of the mold, whereas the ribs and stringers form a circumferential wall of the mold that prevents flowing of the potting sealant compound into neighboring molds.

SUMMARY OF THE INVENTION

It is an object of the invention to improve the manufacture of protected structural aircraft parts.

The invention provides a method for manufacturing a protected profile structural part of a fuselage of an aircraft, the method comprising:

a) providing a finished structural profile part, the finished structural profile part having a surface to be protected;

b) preparing a sealant mold having a mold cavity, wherein the mold cavity has a cross-section that matches a portion of the profile structural part on which the surface to be protected is disposed such that a molded part can be attached to the portion of the profile structural part;

c) filling the mold cavity with a wet sealant, curing or letting cure the wet sealant into a cured sealant member within the mold cavity and removing the cured sealant member from the sealant mold; and d) attaching the cured sealant member to the finished structural profile part in a non-movable manner so as to form a protective liner on the surface to be protected and generate the protected profile structural part.

Preferably, in step c) the curing is carried out at room temperature, i.e. from 15° C. to 28° C. Preferably, in step c) the curing is carried out in a curing oven and/or autoclave.

Preferably, step d) is performed after step c). Preferably, step d) is performed immediately after step c).

Preferably, the sealant mold comprises an injection opening that fluidly connects to the mold cavity, and in step c) the wet sealant is filled into the mold cavity through the injection opening.

Preferably, the sealant mold comprises a discharge opening that fluidly connects to the mold cavity, and in step b) the wet sealant is filled, preferably injected through the injection opening, into the mold cavity until the wet sealant is discharged through the discharge opening.

Preferably, the finished structural profile part comprises a top portion that, when the finished structural profile part is installed on a skin of the fuselage, is spaced apart from the skin, and the surface to be protected is part of the top portion and faces away from the skin, wherein in step b) the mold cavity is prepared such that the cured sealant member is capable of covering the top portion of the finished structural profile part.

Preferably, the finished structural profile part comprises at least one lateral portion that, when the finished structural profile part is installed on a skin of the fuselage, is spaced apart from the skin, and the surface to be protected is part of each lateral portion and faces parallel to the skin, wherein in step b) the mold cavity is prepared such that the cured sealant member is capable of covering at least one lateral portion of the finished structural profile part.

Preferably, in step d) the cured sealant member is attached such that it cannot be removed in a non-destructive manner.

Preferably, in step c) the wet sealant is a self-curing sealant.

Preferably, in step d) the cured sealant member is attached by means of a self-curing wet sealant.

Preferably, the wet sealant is chosen from a group consisting of polysulfide based sealant, polythioether based sealant, epoxy based sealant, and polyurethane based sealant.

Preferably, in step b) the wet sealant is injected with an injection pressure of 0.5 bar to 10 bar.

Preferably, the method is performed at a temperature from 10° C. to 30° C.

Preferably, the sealant mold comprises or is made of a non-stick material that is configured such that in step c) the wet sealant does not bond to the sealant mold. Preferably, the sealant mold portion is made of metal coated with the non-stick material. Preferably, the non-stick material is chosen from among a release agent, PTFE or a fluorosilicone.

The ideas presented herein are generally useful for protecting structural parts against abrasion or mechanical wear or mechanical impact. One idea is their application in rear center tanks of aircraft. The rear center tanks of aircraft are typically formed by finished structural profile parts, such as frames and stringers. Typically, these parts exhibit some surfaces that would be exposed towards the tank cavity.

Here, these surfaces can be protected by a protective liner made of a cured sealant. The whole process can be designated as wet sealant injection molding.

The wet sealant is injected into a mold that is configured to the surface to be protected. The wet sealant is cured thereby forming a cured sealant member that can be attached as a protective liner, e.g., for protecting the structural part against abrasion/mechanical effects. Furthermore, protection against corrosion and leakage can be included.

Suitable self-curing wet sealants are generally known in the field. Examples include MC238 and MC780 available from Chemetall/BASF or PR1782 and PR2001 available from PPG Aerospace. The wet-liquid could be also epoxy, polyurethane, etc. that cures and can form a specific geometry.

In general, the geometry of the part to protect is considered in preparing the cross-section of the mold cavity. Typical thickness of the sealant is between 0 mm and 200 mm, preferably from 1 mm to 15 mm, more preferably from 3 mm to 10 mm. The sealant material can be chosen from sealing materials including polysulfide or polythioether or, more generally, any kind of liquid that cures after a time and can form the required geometry.

Before attachment of the protective liner, the wet sealant is cured, e.g. in a curing oven or autoclave at a temperature elevated above room temperature (above about 15° C. to 28° C.). It is also possible to carry out the curing at room temperature, i.e., from 15° C. to 28° C.

Typical surfaces to protect are on structural parts, such as stringers, frames and couplings. These parts can be protected against abrasion of the liner (rubber) that is installed on top of the structure to protect against an impact.

In general, the following steps are performed. Preparing a mold (e.g., made from PTFE) separate from the part (e.g., stringer, frame, etc.). Injecting the wet sealant into the mold until the squeeze out of sealant indicates that the wet sealant has fully filled the mold cavity. This can be done using injection and discharge openings. They can be made separately or be formed on the end portions of the mold portion. After injection, the entire mold cavity is typically filled with wet sealant and is waiting to cure. Removal of the mold occurs after the sealant is cured. Finally, the cured sealant member is attached to the structural part.

BRIEF DESCRIPTION OF THE DRAWINGS

Embodiments of the invention are described in more detail with reference to the accompanying schematic drawings.

DETAILED DESCRIPTION OF THE PREFERRED EMBODIMENTS

Figures 1A, 1B, 1C, 1D:
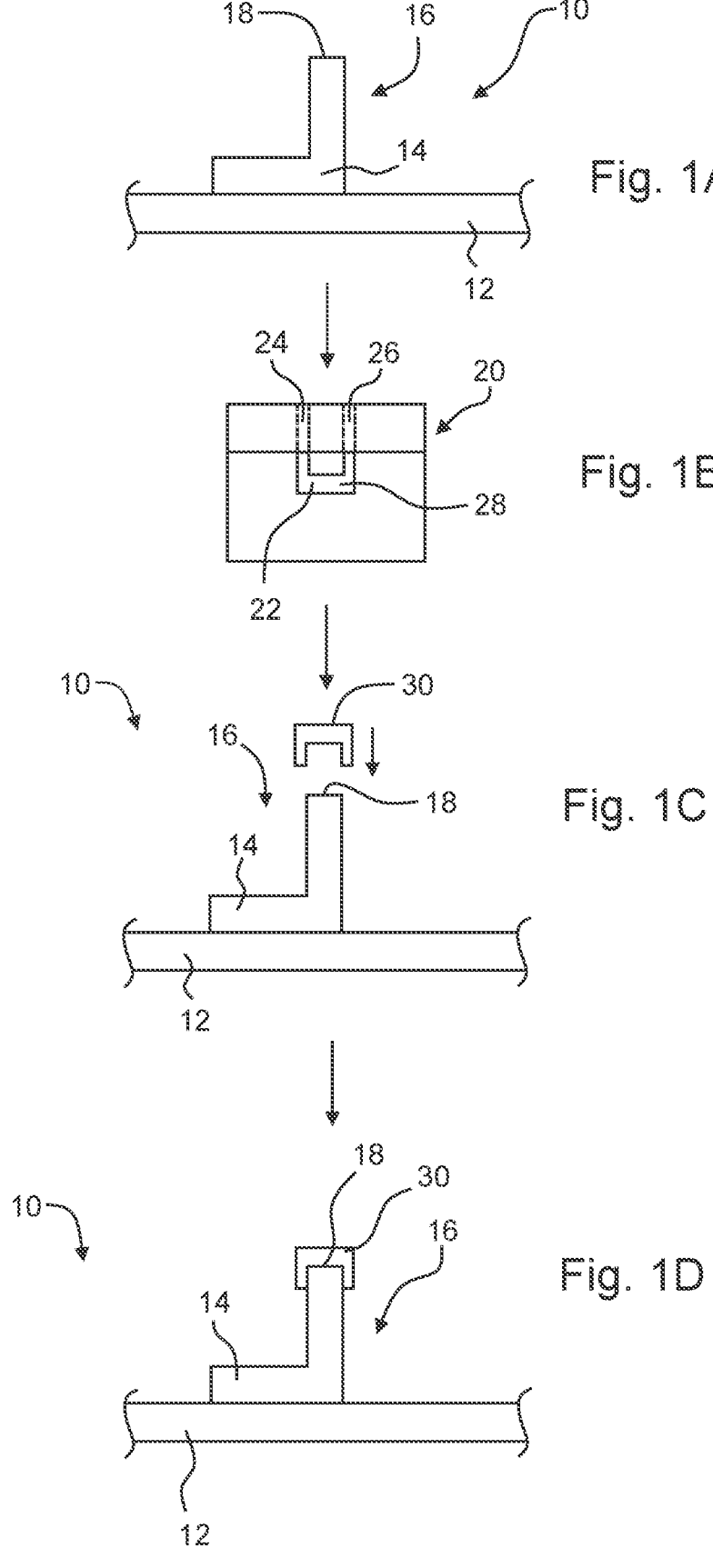
FIG. 1A schematically shows an end elevational view of a finished structural profile part on an aircraft fuselage skin.
FIG. 1B schematically shows a cross sectional view of a mold for forming a sealant member to protect a portion of the finished structural profile part.
FIG. 1C schematically shows an end elevational view of the sealant member being inserted onto the finished structural profile part.
FIG. 1D schematically shows an end elevational view of the sealant member secured on the finished structural profile part.

FIGS. 1A-1D depict an embodiment of a method for manufacturing a protected aircraft structural part viewed along the longitudinal direction of the structural part.

A fuselage 10 comprises a skin 12 and a finished structural profile part 14 as shown in FIG. 1A. The finished structural profile part 14 extends along a longitudinal direction (here, in and out of the drawing). Typical profiles used for the finished profile structural part 14 are U, S, or L-like. The finished structural profile part 14 is preferably formed via a constant cross-section extrusion process. Examples for the profile structural part 14 are structural reinforcement parts, such as a rib, frame or stringer. The finished structural profile part 14 comprises a top portion 16 that is spaced apart from the skin 12. The top portion 16 can be configured as an edge portion. The top portion 16 comprises a surface 18 that is to be protected from mechanical wear. The top portion 16, especially the surface 18, extends along the longitudinal direction of the finished structural profile part 14.

A wet sealant mold 20 is provided as shown in FIG. 1B. The wet sealant mold 20 comprises a mold cavity 22. The mold cavity 22 is configured to match the finished structural profile part 14, specifically the top portion 16, such that a part formed by the sealant mold 20 can be attached to the top portion 16.

A preferred size of the mold cavity 22 is about 3 mm to 10 mm in thickness. However, the mold cavity 22 may reach up to 200 mm in thickness. The wet sealant mold 20 may include an injection opening 24 that is in fluid communication with the mold cavity 22. The injection opening 24 may be formed within a top surface of the wet sealant mold portion 20, as depicted in FIG. 1B, or can be formed in a lateral surface (not shown).

The wet sealant mold 20 may further include a discharge opening 26. The discharge opening 26 is in fluid communication with the mold cavity 22. The discharge opening 26 may be formed in a top surface of the wet sealant mold 20, as depicted in FIG. 1B, or can be formed in a lateral surface (not shown).

The injection opening 24 and the discharge opening 26 are arranged relative to each other such that a fluid injected through the injection opening 24 has to pass through the entire length of the mold cavity 22 in order to reach the discharge opening 26, where the fluid can be discharged.

In other words, the injection opening 24 and the discharge opening 26 can be arranged relative to each other such that a fluid, e.g., uncured wet sealant, flows along the longitudinal direction of the mold cavity 22, preferably starting from the injection opening 24 and towards and/or out the discharge opening 26.

In a variant, the injection opening 24 and/or the discharge opening 26 are formed on the proximal and distal end portions of the wet sealant mold 20, when viewed along its longitudinal direction.

As indicated in FIG. 1B, the injection opening 24 and the discharge opening 26 can, in addition, be spaced apart along a lateral direction of the wet sealant mold 20. Consequently, fluid can pass along the entire length of the wet sealant mold portion 20 before being discharged through the discharge opening 26.

In a next step, still referring to FIG. 1B, an uncured wet sealant 28 is injected into the mold cavity 22. Preferably, the uncured wet sealant 28 is injected through the injection opening 24 into the mold cavity 22 until the uncured wet sealant 28 is discharged from the discharge opening 26.

The wet sealant mold 20 is kept closed until the uncured wet sealant 28 has cured into a cured sealant member 30. Thus, the cured sealant member 30 is integrally formed as a single unitary member. After curing, the cured sealant member 30 is attached to the finished structural profile part 14, as shown in FIGS. 1C and 1D, in a non-movable manner. The cured sealant member 30, once in place, forms a protective liner that protects the surface 18. The cured sealant member 30 is preferably attached to the protected profile structural part 14 by using uncured wet sealant, preferably the same uncured wet sealant from which the cured sealant member 30 was made.

In order to manufacture a protected profile structural part 14 of a fuselage 10 of an aircraft, a sealant mold having a mold cavity 22 having a cross-section that matches a portion of the profile structural part 14 on which the surface 18 to be protected is disposed is prepared. The mold cavity 22 is filled with uncured wet sealant 28 which is subsequently cured into a cured sealant member 30. The cured sealant member 30 is then attached to the finished structural profile part 14 in a non-movable manner so as to form a protective liner on the surface 18 to be protected and generate the protected profile structural part 14.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 10 fuselage
12 skin
14 finished structural profile part
16 top portion
18 surface
20 sealant mold
22 mold cavity
24 injection opening
26 discharge opening
28 uncured wet sealant
30 cured sealant member

The invention claimed is:

1. A method for manufacturing a protected profile structural part of a fuselage of an aircraft, the method comprising:
   a) providing a finished structural profile part, the finished structural profile part having a surface to be protected;
   b) preparing a sealant mold separate from the finished structural profile part, wherein the sealant mold includes a mold cavity, wherein the mold cavity has a cross-section that matches a portion of the profile structural part on which the surface to be protected is disposed, such that a molded part made with the sealant mold can be attached to the portion of the profile structural part;
   c) injecting the mold cavity with uncured wet sealant until a squeeze out of uncured wet sealant indicates that the uncured wet sealant has fully filled the mold cavity, curing or letting cure the uncured wet sealant into a cured sealant member within the mold cavity after the uncured wet sealant has been injected into the mold cavity, and removing the cured sealant member from the sealant mold after the uncured wet sealant has been cured into the cured sealant member; and
   d) attaching the cured sealant member to the finished structural profile part in a non-movable manner so as to form a protective liner on the surface to be protected and to generate the protected profile structural part.

2. The method according to claim 1, wherein in step c) the curing is carried out at room temperature, in a temperature range from 15° C. to 28° C.

3. The method according to claim 1, wherein in step c) the curing is carried out at or in at least one of a curing oven or autoclave at a temperature elevated above room temperature.

4. The method according to claim 1, wherein step d) is performed after step c).

5. The method according to claim 1, wherein the sealant mold comprises an injection opening that fluidly connects to the mold cavity, and in step c) the uncured wet sealant is filled into the mold cavity through the injection opening.

6. The method according to claim 5, wherein the sealant mold comprises a discharge opening that fluidly connects to the mold cavity, and in step c) the uncured wet sealant is injected through the injection opening into the mold cavity until the uncured wet sealant is discharged through the discharge opening.

7. The method according to claim 1, wherein the finished structural profile part comprises a top portion that, when the finished structural profile part is installed on a skin of the fuselage, is spaced apart from the skin, and the surface to be protected is part of the top portion and faces away from the skin, wherein in step b) the mold cavity is prepared such that the cured sealant member is configured to cover the top portion of the finished structural profile part.

8. The method according to claim 1, wherein the finished structural profile part comprises at least one lateral portion that, when the finished structural profile part is installed on a skin of the fuselage, is spaced apart from the skin, and the surface to be protected is part of each lateral portion and faces parallel to the skin, wherein in step b) the mold cavity is prepared such that the cured sealant member is configured to cover at least one lateral portion of the finished structural profile part.

9. The method according to claim 1, wherein in step d) the cured sealant member is attached such that the cured sealant member cannot be removed in a non-destructive manner.

10. The method according to claim 1, wherein in step c) the uncured wet sealant is a self-curing sealant.

11. The method according to claim 10, wherein the wet sealant is chosen from a group consisting of polysulfide based sealant, polythioether based sealant, epoxy based sealant, and polyurethane based sealant.

12. The method according to claim 1, wherein in step d) the cured sealant member is attached via a self-curing wet sealant.

13. The method according to claim 12, wherein the self-curing wet sealant is chosen from a group consisting of polysulfide based sealant, polythioether based sealant, epoxy based sealant, and polyurethane based sealant.

14. The method according to claim 1, wherein in step c) the uncured wet sealant is injected with an injection pressure of 0.5 bar to 10 bar.

15. The method according to claim 1, wherein the method is performed at a temperature between 10° C. and 30° C.

16. The method according to claim 1, wherein the sealant mold comprises or is made of a non-stick material that is configured such that in step c) the uncured wet sealant does not bond to the sealant mold.

17. The method according to claim 16, wherein the non-stick material is chosen from a group consisting of a release agent, PTFE or a fluorosilicone.

\* \* \* \* \*